United States Patent

Melville et al.

[11] Patent Number: 5,903,397
[45] Date of Patent: May 11, 1999

[54] DISPLAY WITH MULTI-SURFACE EYEPIECE

[75] Inventors: Charles D. Melville, Issaquah; Michael Tidwell, Seattle; Richard S. Johnston, Issaquah, all of Wash.; Joel S. Kollin, Long Island City, N.Y.

[73] Assignee: University of Washington, Seattle, Wash.

[21] Appl. No.: 09/072,417

[22] Filed: May 4, 1998

[51] Int. Cl.⁶ .................................................. G02B 27/14
[52] U.S. Cl. .......................... 359/630; 359/631; 359/712; 359/839; 359/880; 359/196; 345/8
[58] Field of Search .............................. 359/13, 630, 631, 359/629, 634, 636, 839, 838, 867, 868, 869, 880, 712; 345/8, 7

[56] References Cited

U.S. PATENT DOCUMENTS

| | | |
|---|---|---|
| 3,453,035 | 7/1969 | Walther . |
| 3,547,520 | 12/1970 | Lee et al. . |
| 4,220,400 | 9/1980 | Vizenor ..................................... 359/712 |
| 5,162,928 | 11/1992 | Taniguchi et al. ......................... 359/13 |
| 5,164,848 | 11/1992 | Firth et al. ................................. 359/13 |
| 5,299,063 | 3/1994 | Fritz et al. ................................. 359/631 |
| 5,305,124 | 4/1994 | Charn et al. .............................. 359/630 |
| 5,384,654 | 1/1995 | Iba ............................................. 359/630 |
| 5,467,104 | 11/1995 | Furness, III et al. ......................... 345/8 |
| 5,557,444 | 9/1996 | Melville et al. .......................... 359/199 |
| 5,587,836 | 12/1996 | Takahashi et al. ........................ 359/630 |
| 5,596,339 | 1/1997 | Furness, III et al. ......................... 345/8 |
| 5,671,076 | 9/1997 | Matsubara et al. ...................... 359/196 |
| 5,694,237 | 12/1997 | Melville .................................... 359/214 |
| 5,701,132 | 12/1997 | Kollin et al. ................................. 345/8 |
| 5,754,344 | 5/1998 | Fujiyama ................................. 359/631 |

FOREIGN PATENT DOCUMENTS 0473343   3/1992   European Pat. Off. .

Primary Examiner—Loha Ben
Attorney, Agent, or Firm—Steven P. Koda

[57] ABSTRACT

An augmented retinal scanning display device includes a multi-functional eyepiece. One function is to direct an image beam onto a viewer's eye. Another function is to correct the vision of the viewer's eye. The display is worn by a viewing person. The eyepiece includes a reflective surface and a transmissive surface. An image beam reflects off the reflective surface onto the viewer's retina enabling the viewer to perceive a virtual image. Background light, such as from the ambient environment or another display device, enters the eyepiece at the transmissive surface and passes through the eyepiece toward the viewer's eye. While passing through the eyepiece, the background light is refracted to correct the viewer's vision.

17 Claims, 3 Drawing Sheets

DISPLAY WITH MULTI-SURFACE EYEPIECE

BACKGROUND OF THE INVENTION

This invention relates to scanning display devices and optical eyepieces, and more particularly to a retinal scanning display having a multi-functional eyepiece.

A virtual retinal display device is an optical device for generating an image upon the retina of an eye. Light is emitted from a light source, passed through a lens, then deflected along a scan path by a scanning device. At a distance defined by the lens the scanned light converges to a focal point for each pixel position. As the scanning occurs the focal point moves along to define an intermediate image plane. The light then diverges beyond the plane. An eyepiece is positioned along the light path beyond the intermediate image plane at some desired focal length. An "exit pupil" occurs shortly beyond the eyepiece in an area where a viewer's eye pupil is to be positioned.

A viewer looks into the eyepiece to view an image. The eyepiece receives light that is being deflected along the scan path. Light thus impinges on the viewer's eye pupil at differing angles at different times during the scanning cycle. This range of angles determines the size of the image perceived by the viewer. Modulation of the light during the scanning cycle determines the content of the image. For a see-through virtual retinal display a user sees the real world environment around the user, plus the added image of the display projected onto the retina.

SUMMARY OF THE INVENTION

According to the invention, an augmented retinal scanning display device includes a multi-functional eyepiece. One function of the eyepiece is to direct an image beam of the display onto a viewer's eye. Another function is to correct the vision of the viewer. The retinal scanning display is carried, mounted or otherwise worn by a viewing person.

According to one aspect of the invention, the eyepiece includes a reflective surface and a transmissive surface. The reflective surface is used by the retinal scanning display. An image beam from the display reflects off the reflective surface onto the viewer's retina enabling the viewer to perceive a virtual image. The transmissive surface passes background light. The curvature of the transmissive surface at which the background light enters the eyepiece differs from an opposite surface at which the background light exits the eyepiece. The variation in curvature and corresponding variation in eyepiece thickness serves to refract the background light correcting the vision of the viewer. In some embodiments the surface opposite the transmissive surface is the reflective surface.

According to an advantage of the invention, the field of view of the display is maximized for a viewer with abnormal vision. By having the eyepiece serve as both an imaging optic and a refractive corrective optic, the eyepiece is closer to the viewers eye. This allows the eyepiece to be smaller for a given field of view. Stated conversely, a given sized eyepiece positioned closer to the eye increases the viewer's field of view. These and other aspects and advantages of the invention will be better understood by reference to the following detailed description taken in conjunction with the accompanying drawings.

DESCRIPTION OF SPECIFIC EMBODIMENTS

Overview

Figure 1:
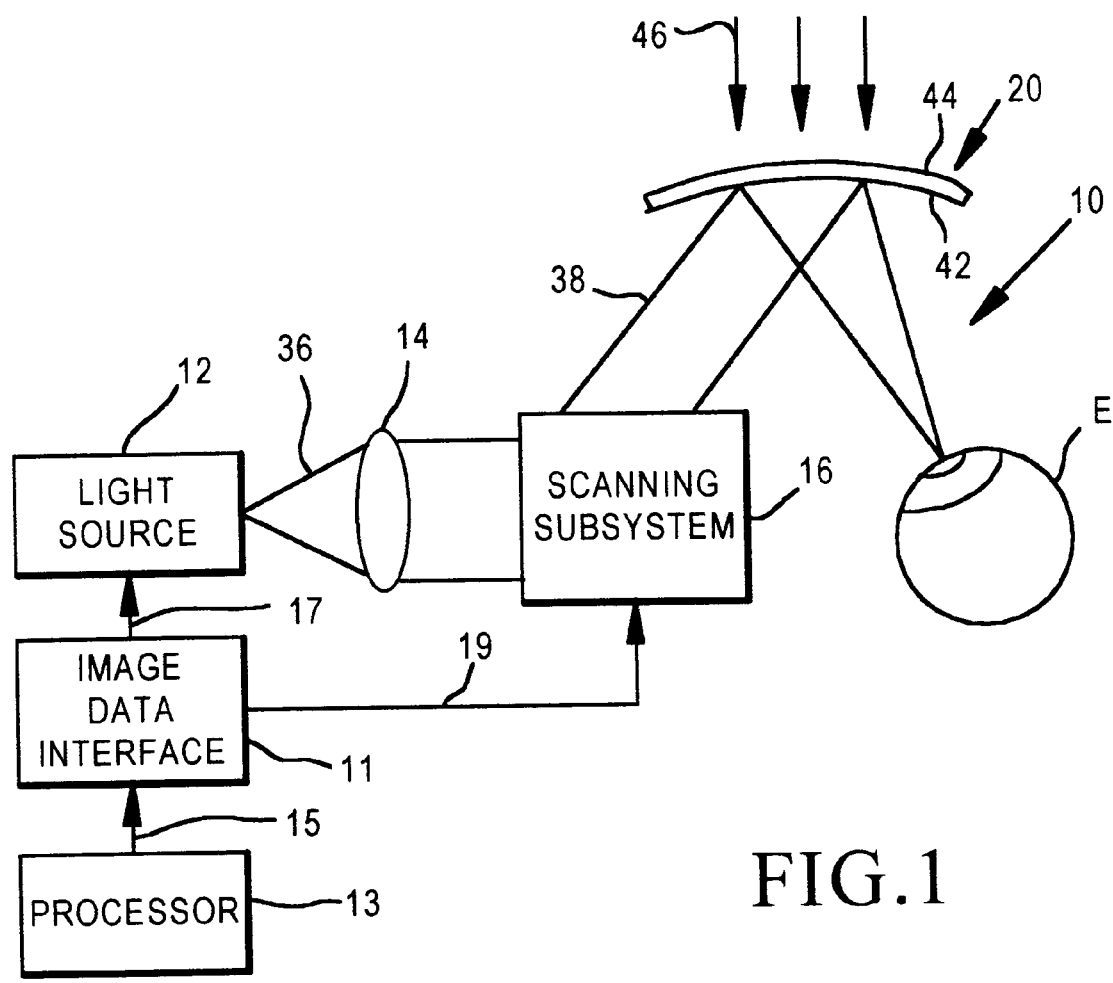
FIG. 1 is a block diagram of a display system according to an embodiment of this invention.

FIG. 1 is an optical schematic diagram of a retinal scanning display 10 according to an embodiment of this invention. The retinal display 10 generates and manipulates light to create color or monochrome images having narrow to panoramic fields of view and low to high resolutions. Light modulated with video information is scanned directly onto the retina of a viewer's eye E to produce the perception of an erect image. The retinal display is small in size and suitable for mounting on the viewer's head. The display 10 includes an image data interface 11 which receives image data in the form of a video or other image signal, such as an RGB signal, NTSC signal, VGA signal or other formatted color or monochrome video or image data signal. The image data is generated by a processor 13 or other digital or analog image data source. The image data interface 11 receives an image signal 15 and in response generates a signal 17 for controlling a light source 12 and a signal 19 for synchronizing the scanner subsystem 16. Light generated by the display 10 is altered according to the image data to generate image elements (e.g., image pixels) which form an image scanned onto the retina of a viewer's eye E.

The light source 12 includes one or more point sources of light. In one embodiment red, green, and blue light sources are included. In one embodiment the light source 12 is directly modulated. That is, the light source 12 emits light with an intensity corresponding to a drive signal. In another embodiment the light source 12 outputs light with a substantially constant intensity that is modulated by a separate modulator in response to the drive signal. The light output along an optical path is modulated according to image data within the image signal. Such modulation defines image elements or image pixels. Preferably the emitted light is spatially coherent.

Light 36 emitted from the light source 12 passes through an optics subsystem 14, then is deflected by the scanner subsystem 16 toward the eyepiece 20. The eyepiece 20 directs the light into the viewer's eye E. In one embodiment the scanning subsystem 16 receives a horizontal deflection signal and a vertical deflection signal (e.g., SYNCH signals) derived from the image data interface 11. Typically the light is deflected along a prescribed pattern, such as a raster pattern, although in an alternative embodiment another display format such as vector imaging can be used. In one embodiment, the horizontal scanner includes a mechanical resonator for deflecting passing light, such as that described in U.S. Pat. No. 5,557,444 to Charles D. Melville entitled, "Miniature Optical Scanner for a Two Axis Scanning System," which is incorporated herein by reference. Alternatively, the horizontal scanner may be an acousto-optic device or a resonant or non-resonant micro-electromechanical device. The scanning subsystem includes a horizontal scanner and a vertical scanner.

Light Source

The light source 12 includes a single or multiple light emitters. For generating a monochrome image a single monochrome emitter typically is used. For color imaging, multiple light emitters are used. Exemplary light emitters include colored lasers, laser diodes or light emitting diodes (LEDs). Although LEDs typically do not output coherent light, lenses are used in one embodiment to shrink the apparent size of the LED light source and achieve flatter wave fronts. In a preferred LED embodiment a single mode monofilament optical fiber receives the LED output to define a point source which outputs light approximating coherent light.

Where the light emitters are externally modulated, the display device 10 also includes a modulator responsive to an image data signal received from the image data interface 11. The modulator modulates the visible light emitted by the light emitters to define image content for the virtual imagery scanned on a viewer's eye E. The modulator is an acoustooptic, electrooptic, or micro-electromechanical modulator.

Additional detail on these and other light source 12 embodiments are found in U.S. Pat. No. 5,596,339 to Furness, III et al. for "Virtual Retinal Display with Fiber Optic Point Source" issued Jan. 21, 1997, and incorporated herein by reference.

According to alternative embodiments, the light sources or the light generated by the point sources are modulated to include red, green, and/or blue components at a given point (e.g., pixel) of a resulting image. Respective beams of the point sources are modulated to introduce color components at a given pixel.

Image Data Interface

The retinal display device 10 is an output device which receives image data to be displayed. Such image data is received as an image data signal at the image data interface 11. In various embodiments, the image data signal is a video or other image signal, such as an RGB signal, NTSC signal, VGA signal or other formatted color or monochrome video or graphics signal. An exemplary embodiment of the image data interface 11 extracts color component signals and synchronization 'SYNCH' signals from the received image data signal. In an embodiment in which an image data signal has embedded red, green and blue components, the red signal is extracted and routed to a modulator for modulating a red light point source output. Similarly, the green signal is extracted and routed to a modulator for modulating the green light point source output. Also, the blue signal is extracted and routed to a modulator for modulating the blue light point source output.

The image data signal interface 11 extracts a horizontal synchronization component and vertical synchronization component from the image data signal. In one embodiment, such signals define respective frequencies for horizontal scanner and vertical scanner drive signals routed to the scanning subsystem 16.

Scanning Subsystem

The scanning subsystem 16 is located after the light source 12, either before or after the optics subsystem 14. In one embodiment the scanning subsystem 16 includes a resonant scanner 200 (see FIG. 2) for performing horizontal beam deflection and a galvanometer for performing vertical beam deflection. The scanner 200 serving as the horizontal scanner receives a drive signal having a frequency defined by the horizontal synchronization signal extracted at the image data interface 11. Similarly, the galvanometer serving as the vertical scanner receives a drive signal having a frequency defined by the vertical synchronization signal VSYNC extracted at the image data interface. Preferably, the horizontal scanner 200 has a resonant frequency corresponding to the horizontal scanning frequency.

Figure 2:
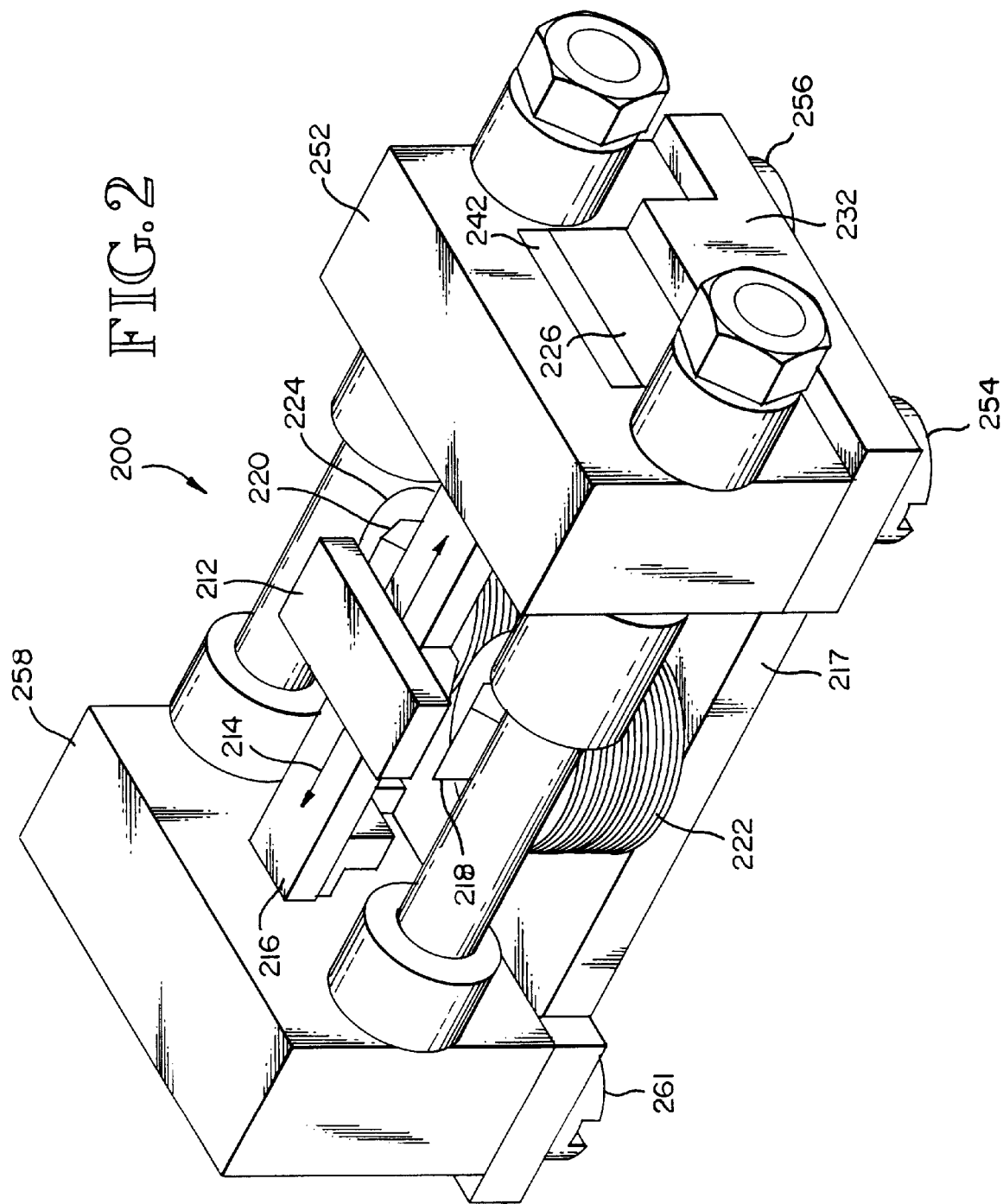
FIG. 2 is a perspective drawing of an exemplary scanning subsystem for the display of FIG. 1.

Referring to FIG. 2, the scanner 200 includes a mirror 212 driven by a magnetic circuit so as to oscillate at a high frequency about an axis of rotation 214. In one embodiment the only moving parts are the mirror 212 and a spring plate 216. The optical scanner 200 also includes a base plate 217 and a pair of electromagnetic coils 222, 224 with a pair of stator posts 218, 220. Stator coils 222 and 224 are wound in opposite directions about the respective stator posts 218 and 220. The electrical coil windings 222 and 224 may be connected in series or in parallel to a drive circuit as discussed below. Mounted on opposite ends of the base plate 217 are first and second magnets 226, the magnets 226 being equidistant from the stators 218 and 220. The base 217 is formed with a back stop 232 extending up from each end to form respective seats for the magnets 226.

The spring plate 216 is formed of spring steel and is a torsional type of spring having a spring constant determined by its length and width. Respective ends of the spring plate 216 rest on a pole of the respective magnets 226. The magnets 226 are oriented such that they have like poles adjacent the spring plate. Caps 252, 258 secured by bolts 254, 256, 261 hold the spring plate ends 242 to the magnets 226.

The mirror 212 is mounted directly over the stator posts 218 and 220 such that the axis of rotation 214 of the mirror is equidistant from the stator posts 218 and 220. The mirror 212 is mounted on or coated on a portion of the spring plate.

Magnetic circuits are formed in the optical scanner 200 to oscillate the mirror 212 about the axis of rotation 214 in response to an alternating drive signal. One magnetic circuit extends from the top pole of the magnets 226 to the spring plate end 242, through the spring plate 216, across a gap to the stator 218 and through the base 217 back to the magnet 226 through its bottom pole. Another magnetic circuit extends from the top pole of the other magnet 226 to the other spring plate end, through the spring plate 216, across a gap to the stator 218 and through the base 217 back to the magnet 226 through its bottom pole. Similarly, magnet circuits are set up through the stator 220.

When a periodic drive signal such as a square wave is applied to the oppositely wound coils 222 and 224, magnetic fields are created which cause the mirror 212 to oscillate back and forth about the axis of rotation 214. More particularly, when the square wave is high for example, the magnetic field set up by the magnetic circuits through the stator 218 and magnets 226 and 228 cause an end of the mirror to be attracted to the stator 218. At the same time, the magnetic field created by the magnetic circuits extending through the stator 220 and the magnets 226 cause the opposite end of the mirror 212 to be repulsed by the stator 220. Thus, the mirror is caused to rotate about the axis of rotation 214 in one direction. When the square wave goes low, the magnetic field created by the stator 218 repulses the end of the spring plate 216 whereas the stator 220 attracts the other end of the spring plate 216 so as to cause the mirror 212 to rotate about the axis 214 in the opposite direction.

In alternative embodiments, the scanning subsystem 14 instead includes acousto-optical deflectors, electro-optical deflectors, rotating polygons or galvanometers to perform the horizontal and vertical light deflection. In some embodiments, two of the same type of scanning device are used. In other embodiments different types of scanning devices are used for the horizontal scanner and the vertical scanner.

Optics Subsystem

The optics subsystem 14 receives the light 36 output from the light source, either directly or after passing through the scanning subsystem 16. In some embodiments the optical subsystem collimates the light. In another embodiment the optics subsystem converges the light. Left undisturbed, the light converges to a focal point then diverges beyond such point. As the converging light is deflected, however, the focal point is deflected. The pattern of deflection defines a pattern of focal points. Such pattern is referred to as an intermediate image plane.

Eyepiece

The eyepiece 20 typically is a lens or lens system receiving the light beam(s) 38 prior to entering the eye E. The eyepiece 20 serves to relay the rays from the scanner subsystem 16 toward a viewer's eye. In particular the eyepiece 20 contributes to the location where an exit pupil of the retinal display 10 forms. The eyepiece 20 defines an exit pupil at a known distance from the eyepiece 20. Such location is the expected location for a viewer's eye E.

In a preferred embodiment, the eyepiece 20 is at least partially transmissive to allow a viewer to view the real world in addition to the virtual image. Light 38 from the scanning subsystem 16 impinges on a concave internal surface 42 of the eyepiece 20 and is reflected into the eye E. Background light 46 from the ambient environment or another display source impinges on an exterior surface 44 of the eyepiece. The background light 46 passes through the eyepiece 20 and exits toward the eye E. In a preferred embodiment the internal surface 42 reflects light impinging from one side (e.g., the side at which the display light impinges) and transmits light entering from the convex exterior surface 44 that passes through the eyepiece and exits through the internal surface 42. In the embodiments shown in FIGS. 2 and 3 substantially all of the internal surface 42 reflects light from the scanning assembly 16. The internal surface 42 may be coated to improve its reflectivity to light arriving from the scanner assembly 16. In an alternative embodiment of FIG. 4, the internal surface 42 includes a discrete reflector 43 that is positioned to receive the scanned beam from the scanning assembly 16. One skilled in the art will recognize that for limited field of view virtual images, the reflector 43 need not cover the entire internal surface 42. Consequently the background light exits the eyepiece 20' from a portion 48 of the internal surface 42 differing from the reflector 43. In one embodiment the reflector 43 is generally spherical in shape. The scanning assembly 16 is positioned at an appropriate distance along the eyeglass frame 52 to have the reflector 43 direct the light toward the expected position of the viewer's eye pupil. The precise position of the scanning assembly may be adjusted for a specific user's viewing comfort and convenience.

The eyepiece 20 serves an additional function besides reflecting the image light 38 and transmitting the background light 46. The eyepiece 20 also provides refractive correction for the viewing eye E. Specifically, the curvature of the surface 44 differs than the curvature of the surface at which the background light exits the eyepiece 20 (e.g., surface 42 or surface 48). The difference in curvature results in a varying thickness of the eyepiece 20 causing light passing through the eyepiece to be refracted. The variation in curvature is determined according to an eye prescription for a given viewer so as to correct the vision of the corresponding viewer.

Returning to FIG. 3, the eyepiece 20 and scanning assembly 16 are mounted to an eyeglass frame 50 for wearing by a viewer V. The scanning assembly 16 is mounted to a temple 52 of the frame 50 and oriented to direct the image light 38 to the internal surface 42 of the eyepieces 20.

As described above, light 46 from the ambient environment passes through the eyepiece 20 into the eye E while light from the scanning assembly 16 is reflected to the eye E by the internal surface 42. Advantageously, the curvature of the internal and exterior surfaces 42, 44 are selected to correct the vision of the viewer's eyes. The actual curvatures are readily determinable according to conventional refractive eyeglass design approaches.

Meritorious and Advantageous Effects

According to an advantage of the invention, the field of view of the display is maximized for a viewer with abnormal vision. By having the eyepiece serve as both an imaging optic and a refractive corrective optic, the eyepiece is closer to the viewers eye. this allows the eyepiece to be smaller for a given field of view. Stated conversely, a given sized eyepiece positioned closer to the eye increases the viewer's field of view.

Figure 3:
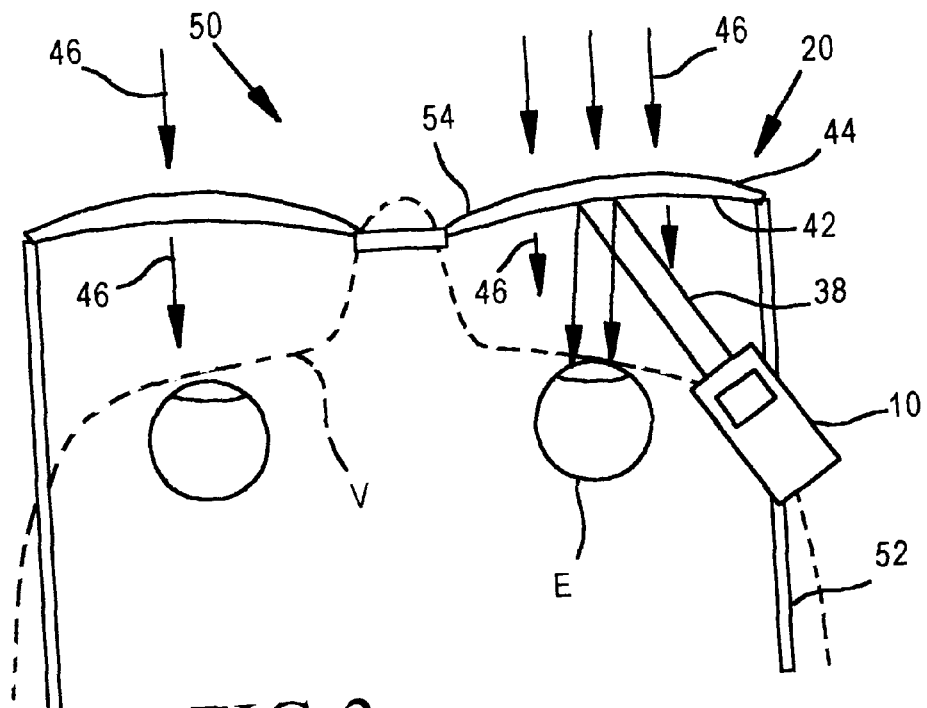
FIG. 3 is a diagram of a mounting configuration for a display according to an embodiment of this invention.
Figure 4:
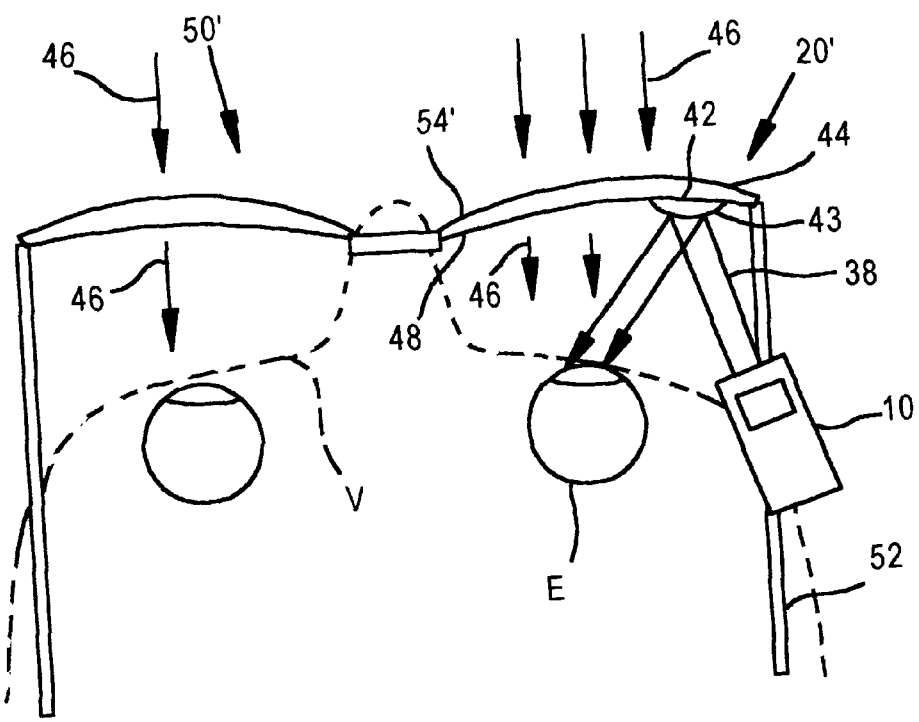
FIG. 4 is a diagram of a mounting configuration for a display according to another embodiment of this invention

Although the invention has been illustrated and described, various alternatives, modifications and equivalents may be used. For example, while the embodiments of FIGS. 3 and 4 show the light sources 12 as mounted to the temples 52, in some applications the light sources 12 can be mounted remotely and coupled to the scanning assemblies through optical fibers, in a manner described in U.S. Pat. No. 5,596,339 to Furness, III et al. for "Virtual Retinal Display with Fiber Optic Point Source" issued Jan. 21, 1997. Also, although the embodiments described herein are in the form of eyeglasses, one skilled in the art will recognize the applicability of the invention to helmet visors and a variety of other visors. Therefore, the foregoing description should not be taken as limiting the scope of the inventions which are defined by the appended claims.

What is claimed is:

1. An augmented scanning display apparatus, comprising:

an image source for generating image light;

a scanner for scanning the image light along a predetermined path;

an eyepiece having a first surface upon which the scanned image light impinges, the first surface reflecting the scanned image light onto a retina, the eyepiece having a second surface upon which background light impinges, the eyepiece being transmissive to the background light received at the second surface, the background light passing through the eyepiece from the second surface and exiting at a third surface toward the retina, wherein the second surface has a first curvature and the third surface has a second curvature different from the first curvature causing refractive correction of the background light entering the retina.

2. The apparatus of claim 1, wherein the first surface is part of the third surface.

3. The apparatus of claim 1, further comprising an image signal source and a modulator which modulates the generated image light according to an image signal.

4. The apparatus of claim 1, in which the scanner and eyepiece are mounted to a viewer's head.

5. The apparatus of claim 1, in which the scanner is mounted adjacent to a viewer's temple.

6. The apparatus of claim 1, in which the image source is coupled to the scanner with a fiberoptic.

7. The apparatus of claim 1, further comprising an eyeglass frame to which the scanner and eyepiece are mounted.

8. The apparatus of claim 1, in which the eyepiece is part of a helmet visor.

9. A pair of corrective glasses, comprising:

a frame;

a corrective lens carried by the frame and positioned for alignment to an expected position of a user's eye, the lens including a curved internal surface facing the expected eye position and a curved external surface opposite the internal surface; and a scanned light source operative to emit a modulated, scanned beam of light, the scanned light source being oriented to emit the scanned beam of light along a path toward the internal surface, the scanned light source further being oriented to define the path such that the emitted light beam travels to the user's expected eye position.

10. The glasses of claim 9, in which the scanned light source is mounted on the frame at an area adjacent to a user's expected temple area.

11. The glasses of claim 9, in which the scanned light source comprises a scanner and a light source, wherein the scanner is mounted to the frame and wherein the light source is coupled to the scanner with a fiberoptic.

12. The glasses of claim 9, in which the lens is part of a helmet visor.

13. A corrective lens, comprising:

a curved internal surface facing an expected eye position and a curved external surface opposite the internal surface, wherein curvature of the internal surface differs from curvature of the external surface; and a reflector along the internal surface.

14. The lens of claim 13, in which the reflector is a reflective coating over a portion of the internal surface.

15. The lens of claim 13, in which the reflector is spherically shaped to reflect light to an expected eye position of a user wearing the lens.

16. A method for generating a virtual image on a retina of a viewer's eye in response to an image data signal, the method comprising the steps of:

generating a light beam;

modulating the light beam as a function of the image data signal to define a sequence of display pixels forming the virtual image;

deflecting the modulated light beam along a predetermined pattern;

receiving the deflected light beam at a reflective surface of an eyepiece, the reflective surface reflecting the received light beam onto the retina;

receiving background light at another surface of the eyepiece; and passing the background light through the eyepiece along a refractive path toward the viewer's eye, wherein refractive correction is applied to the background along the refractive path.

17. The method of claim 16, in which the step of passing comprises passing the background light through the eyepiece from said another surface out of said reflective surface toward the viewer's eye.

* * * * *